United States Patent
Hironishi et al.

(10) Patent No.: US 8,965,221 B2
(45) Date of Patent: Feb. 24, 2015

(54) RECEIVER AND CROSS PHASE MODULATION REDUCTION METHOD

(75) Inventors: Kazuo Hironishi, Yokohama (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 13/484,892

(22) Filed: May 31, 2012

(65) Prior Publication Data

US 2012/0308233 A1 Dec. 6, 2012

(30) Foreign Application Priority Data

Jun. 6, 2011 (JP) ................................. 2011-126143

(51) Int. Cl.
*H04B 10/06* (2006.01)
*H04B 10/61* (2013.01)

(52) U.S. Cl.
CPC ............ *H04B 10/611* (2013.01); *H04B 10/614* (2013.01); *H04B 10/6165* (2013.01)
USPC ............................ 398/208; 398/203; 398/204

(58) Field of Classification Search
CPC .. H04B 10/611; H04B 10/614; H04B 10/615; H04B 10/6151; H04B 10/6165
USPC ................................................. 398/202–208
See application file for complete search history.

(56) References Cited

U.S. PATENT DOCUMENTS

| 6,626,591 | B1 | 9/2003 | Bellotti et al. | |
|---|---|---|---|---|
| 2008/0075463 | A1 | 3/2008 | Nakamoto | |
| 2009/0087194 | A1* | 4/2009 | Nakashima et al. | 398/158 |
| 2009/0208224 | A1* | 8/2009 | Kikuchi | 398/141 |
| 2010/0329697 | A1* | 12/2010 | Koizumi et al. | 398/208 |
| 2011/0033191 | A1 | 2/2011 | Hauske et al. | |

FOREIGN PATENT DOCUMENTS

| JP | 2000-196525 | 7/2000 |
|---|---|---|
| JP | 2003-224521 | 8/2003 |
| JP | 2008-78962 | 4/2008 |
| JP | 2009-159054 | 7/2009 |
| WO | WO 2009/124961 | 10/2009 |

OTHER PUBLICATIONS

J C. Rasmussen et al., "Digital Coherent Receiver Technology for 100-Gbps Optical Transport Systems.", *Fujitsu.* 60, 5, p. 476-483, Sep. 2009.

* cited by examiner

*Primary Examiner* — Dzung Tran
(74) *Attorney, Agent, or Firm* — Staas & Halsey LLP (57) ABSTRACT

A receiver includes: an extraction circuit to extract a phase fluctuation component common to phase data of two polarization components that are separated in a coherent reception of a polarization multiplexing phase modulation optical signal; and a correction circuit to correct the phase data of the two polarization components in accordance with the phase fluctuation component.

13 Claims, 10 Drawing Sheets

RECEIVER AND CROSS PHASE MODULATION REDUCTION METHOD

CROSS-REFERENCE TO RELATED APPLICATION(S)

This application is based upon and claims the benefit of priority of the prior Japanese Patent Application No. 2011-126143, filed on Jun. 6, 2011, the entire contents of which are incorporated herein by reference.

FIELD

The embodiments discussed herein are related to a receiver and a cross phase modulation reduction method.

BACKGROUND

By parallel implementation, digital signal processing semiconductor devices have extended the operating speed to tens of gigabit per second. With this development, a digital coherent optical communication that enables multilevel transmission using the digital signal processing is studied as a long haul and large capacity communication technique and is making progress.

In the digital coherent optical communication, both intensity and phase of an optical signal are manipulated with a digital circuit. As a result, the chromatic dispersion and the fast-fluctuating polarization mode dispersion (PMD) in an optical fiber are easily compensated, and high sensitivity due to the coherent receiving is also expected.

Related art is disclosed in International Publication Pamphlet No. WO 2009124961, Rasumussen, Hoshida, and Nakashima, "Digital Coherent Receiver Technology for 100-Gbps Optical Transport Systems, *FUJITSU.* 60, 5, pp. 476-483, September 2009, and the like.

SUMMARY

According to an aspect of the invention, a receiver includes: an extraction circuit to extract a phase fluctuation component common to phase data of two polarization components that are separated in a coherent reception of a polarization multiplexing phase modulation optical signal; and a correction circuit to correct the phase data of the two polarization components in accordance with the phase fluctuation component.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
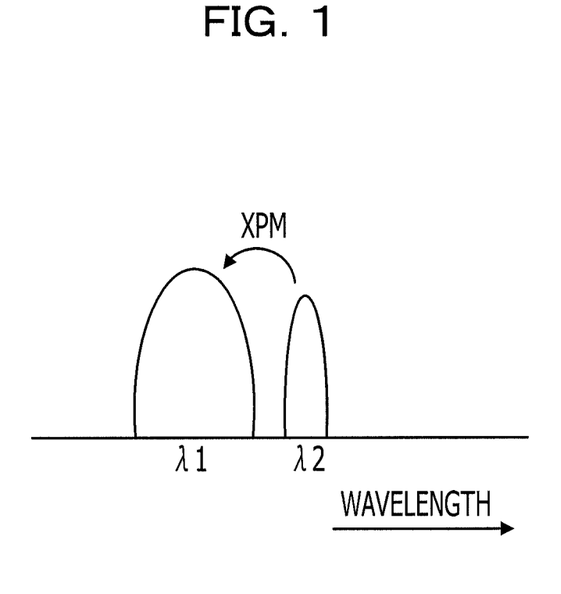
FIG. 1 illustrates an exemplary cross phase modulation (XPM)

In the digital coherent optical communication, optical data transport may be carried out with a modulation system including a polarization multiplexing quadrature phase shift keying (QPSK). In an optical fiber transport path, an optical communication based on an intensity modulation system may be used. FIG. 1 illustrates an exemplary cross phase modulation. When a wavelength $\lambda 1$ of an optical signal of a phase modulation system for the digital coherent optical communication is set to be close to a wavelength $\lambda 2$ of an optical signal in the intensity modulation system, phase noise is generated of the optical signal in the phase modulation system by a temporally changing cross phase modulation (XPM) that is generated based on an intensity of temporally changing electric field of the optical signal in the intensity modulation system.

For example, in a case where noise derived from a cause other than the XPM is mixed in one phase modulation optical signal or the other phase modulation optical signal when the one phase estimation value is overlapped with the other phase estimation value, the noise may be increased.

Figure 2:
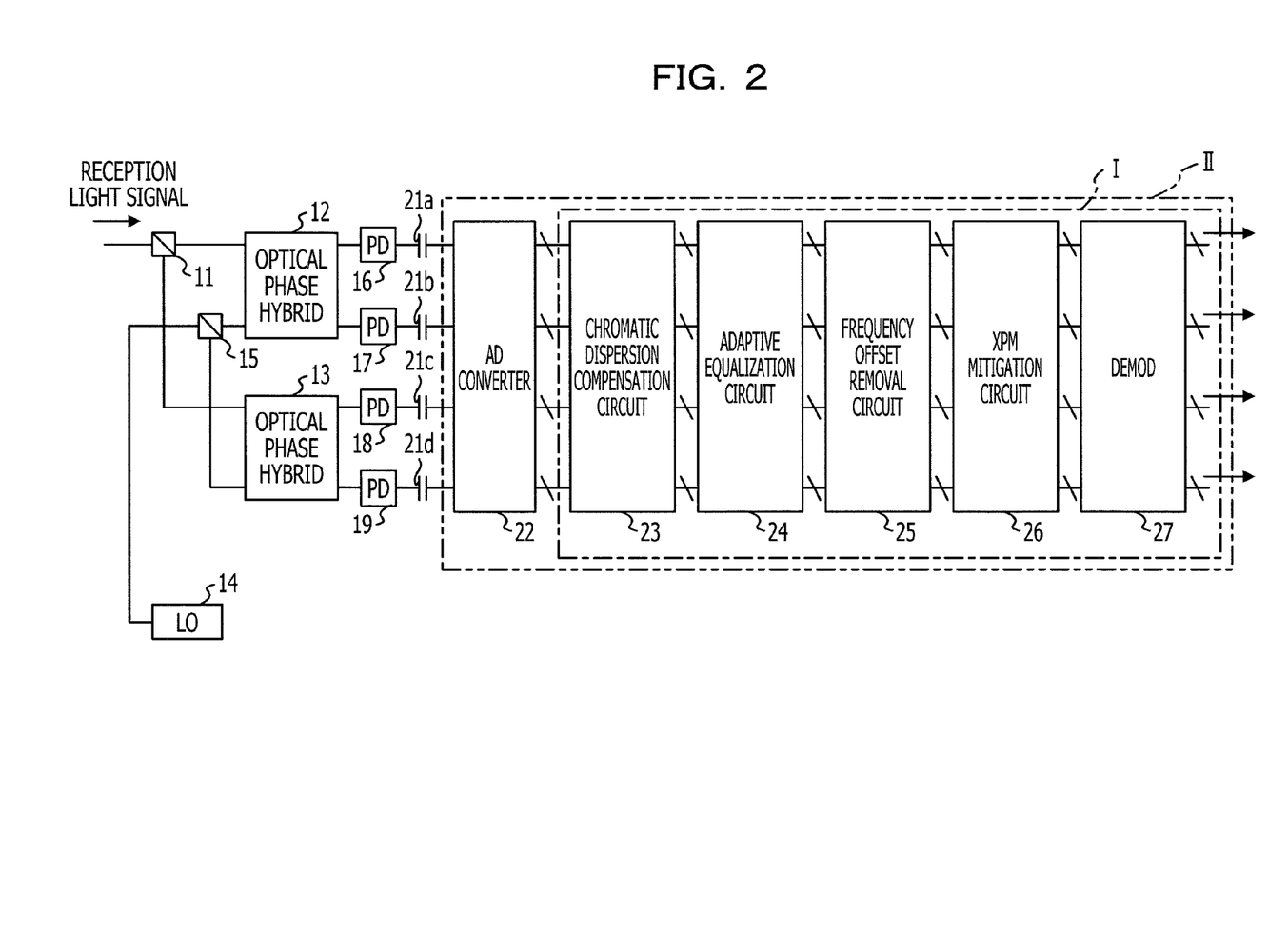
FIG. 2 illustrates an exemplary optical receiver.

FIG. 2 illustrates an exemplary optical receiver. The optical receiver illustrated in FIG. 2 may be an optical receiver in a digital coherent optical communication system. The optical receiver may receive an optical signal of a polarization multiplexing multi-valued (M-valued) PSK modulation. For example, the optical receiver may correspond to the QPSK modulation system of M=4. M may also be 8, 16, 32, or the like other than 4.

A polarization separator 11 separates a received optical signal into two orthogonal polarization components, for example, an X polarization component and a Y polarization component. The X polarization component is supplied to an optical phase hybrid 12, and the Y polarization component is supplied to an optical phase hybrid 13. Local oscillation light output from a local oscillator (LO) 14 branches into two by an optical branching filter 15 where one is supplied to the optical phase hybrid 12, and the other is supplied to the optical phase hybrid 13.

The optical phase hybrid 12 obtains one set of outputs obtained through mutual interference of the X polarization component and the local oscillation light in in-phase and reverse phase and one set of outputs obtained through orthogonal) (+90° and reverse orthogonal) (−90° interference to be supplied to photodiodes 16 and 17. The photodiodes 16 and 17 may be balanced photodiodes. The photodiode 16 differentially receives the in-phase and reverse phase interference light and outputs an electric signal of an in-phase interference component (I) of the X polarization component and the local oscillation light. The photodiode 17 differentially receives orthogonal and reverse orthogonal interference light and outputs an electric signal of an orthogonal interference component (Q) of the X polarization component and the local oscillation light.

The optical phase hybrid 13 obtains one set of outputs obtained through mutual interference of the Y polarization component and the local oscillation light in in-phase and reverse phase and one set of outputs obtained through orthogonal) (+90° and reverse orthogonal) (−90° interference to be supplied to photodiodes 18 and 19. The photodiodes 18 and 19 may be balanced photodiodes. The photodiode 18 differentially receives the in-phase and reverse phase interference light and outputs an electric signal of an in-phase interference component (I) of the Y polarization component and the local oscillation light. The photodiode 19 differentially receives orthogonal and reverse orthogonal interference light and outputs an electric signal of an orthogonal interference component (Q) of the Y polarization component and the local oscillation light.

Circuits such as electrostatic capacitors 21a to 21d remove direct-current components from the IQ component of the X polarization and the IQ component of the Y polarization, and the IQ component of the X polarization and the IQ component of the Y polarization are supplied to an AD converter 22 for digitalization. Digital values of the IQ component of the X polarization and the IQ component of the Y polarization are subjected to a chromatic dispersion compensation through a digital process in a chromatic dispersion compensation circuit 23. An equalization process such as a compensation for a mixture of the X polarization and the Y polarization is carried out on the digital values of the IQ component of the X polarization and the IQ component of the Y polarization by an adaptive equalization circuit 24. The digital values after the equalization process are subjected to a frequency offset removal by a frequency offset removal circuit 25 and supplied to an XPM mitigation circuit 26.

The XPM mitigation circuit 26 performs a correction for mitigating the XPM on each of the IQ component of the X polarization and the IQ component of the Y polarization. The IQ component of the X polarization and the IQ component of the Y polarization output by the XPM mitigation circuit 26 are supplied to a demodulator circuit (DEMOD). For example, the multi-value PSK demodulation such as the QPSK demodulation is carried out on each of the IQ component of the X polarization and the IQ component of the Y polarization, and the demodulated signals are output.

The chromatic dispersion compensation circuit 23, the adaptive equalization circuit 24, the frequency offset removal circuit 25, and the XPM mitigation circuit 26 surrounded by a dashed-dotted line I illustrated in FIG. 2 may be implemented in a digital signal processor (DSP) that is for example a one-chip semiconductor integrated circuit. The AD converter 22, the chromatic dispersion compensation circuit 23, the adaptive equalization circuit 24, the frequency offset removal circuit 25, and the XPM mitigation circuit 26 surrounded by a dashed-two dotted line II may correspond to a one-chip semiconductor integrated circuit.

Figure 3:
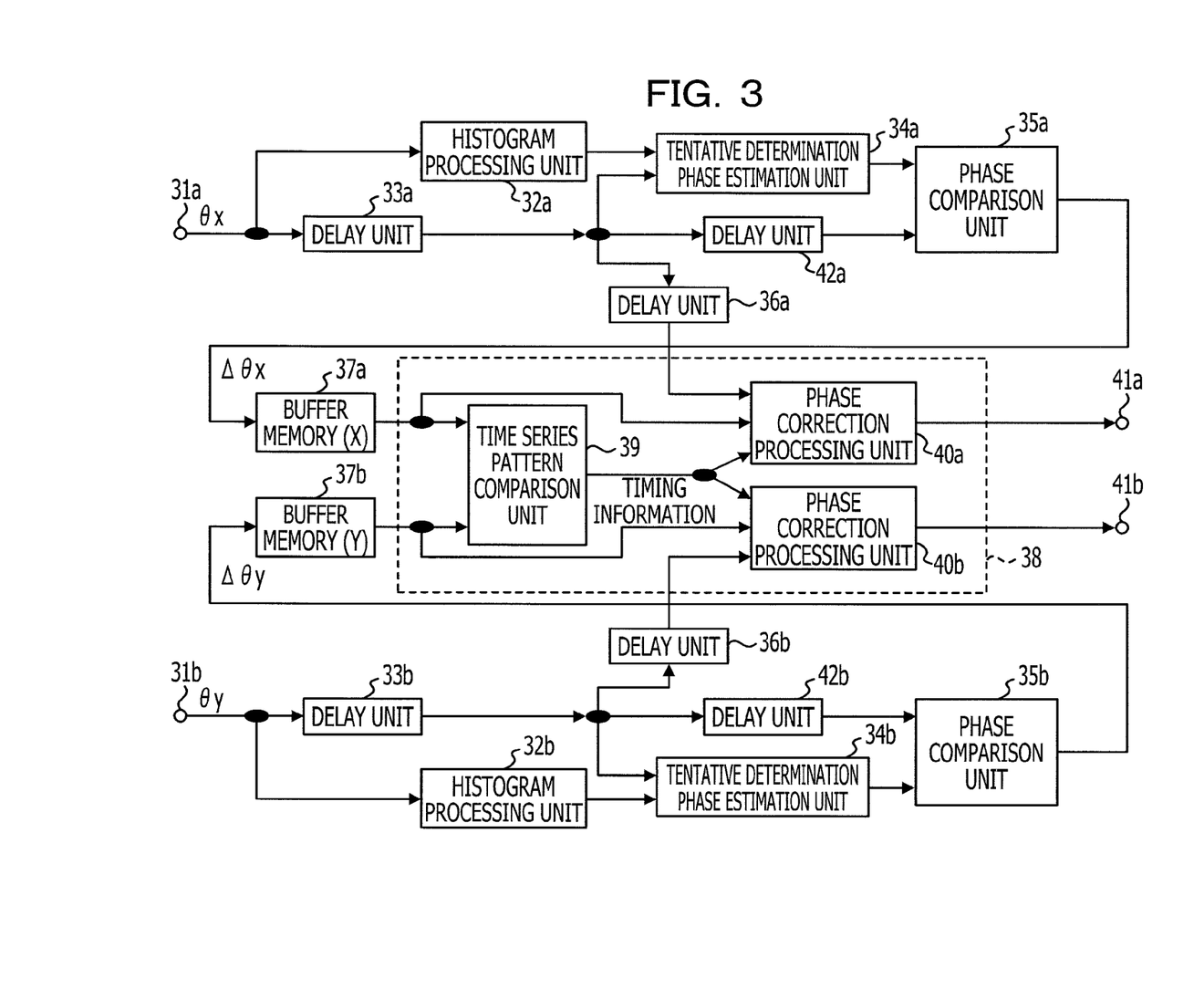
FIG. 3 illustrates an exemplary XPM mitigation circuit.
Figure 4:
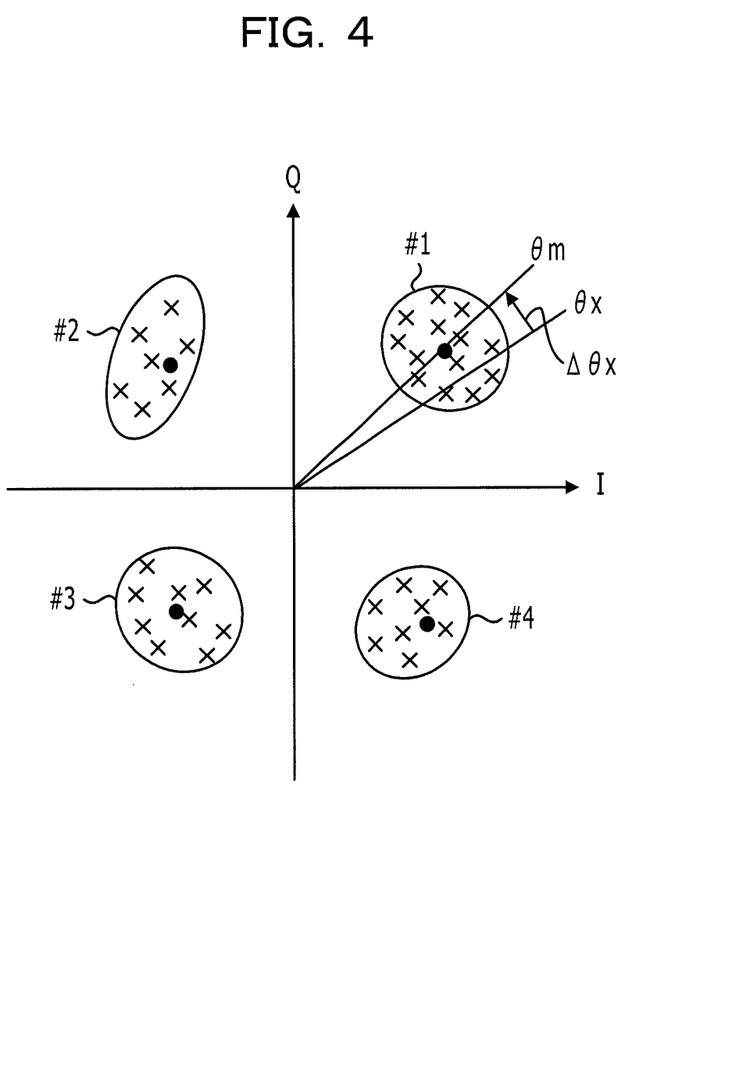
FIG. 4 illustrates an exemplary constellation.

FIG. 3 illustrates an exemplary XPM mitigation circuit. The XPM mitigation circuit illustrated in FIG. 3 may be the XPM mitigation circuit 26 illustrated in FIG. 2. FIG. 4 illustrates an exemplary constellation. A constellation illustrated in FIG. 4 may be a constellation of the QPSK signal. In FIG. 3, terminals 31a and 31b are respectively supplied from the frequency offset removal circuit 25 with X polarization reception phase data θx and Y polarization reception phase data θy. The reception phase data θx and θy may be values N sufficiently larger than M (N>>M) (in the case of the QPSK, M=4) and may be represented as N bits.

The X polarization reception phase data θx is supplied to a histogram processing unit 32a and a delay unit 33a. The histogram processing unit 32a creates a histogram of the reception phase data θx. In a case where the polarization is subjected, for example, to the QPSK modulation, the X histogram processing unit 32a obtains the constellation illustrated in FIG. 4 to be supplied to a tentative determination phase estimation unit 34a. Each x mark in FIG. 4 represents reception phase data θx in the past.

Using the delay unit 33a, the X polarization reception phase data θx delayed by a process time of the histogram processing unit 32a is supplied to the tentative determination phase estimation unit 34a. The tentative determination phase estimation unit 34a estimates which phase group the reception phase data θx belongs to among phase groups #m (in the case of the QPSK modulation, m=an integer of 1 to 4) included in the constellation illustrated in FIG. 4, for example, estimates which phase group is the closest, and supplies the estimation result to a phase comparison unit 35a.

The phase comparison unit 35a compares the X polarization reception phase data θx, in which an output of the delay unit 33a is delayed by a delay unit 42a by a process time of the tentative determination phase estimation unit 34a and supplied, with a center of the phase group #m, for example, a phase θm represented by ● illustrated in FIG. 4 and obtains a fluctuation component Δθx (=θx'θm) of the reception phase data θx. The fluctuation component Δθx is represented by N bits and stored in a buffer memory 37a.

The Y polarization reception phase data θy is supplied to a histogram processing unit 32b and a delay unit 33b. The histogram processing unit 32b generates a histogram of the reception phase data θy. In a case where the Y polarization is subjected, for example, to the QPSK modulation, the histogram processing unit 32b obtains the constellation illustrated in FIG. 4 to be supplied to a tentative determination phase estimation unit 34b.

The tentative determination phase estimation unit 34b is supplied by the delay unit 33b with the Y polarization reception phase data θy delayed by a process time of the histogram processing unit 32b. The tentative determination phase estimation unit 34b estimates which phase group the reception phase data θy belongs to among the phase group #m included in the constellation, for example, estimates which phase group is the closest and supplies the estimation result to a phase comparison unit 35b.

The phase comparison unit 35b compares the Y polarization reception phase data θy, in which an output of the delay unit 33b is delayed by a delay unit 42b by a process time of the tentative determination phase estimation unit 34b and supplied, with the phase θm at the center of the phase group #m and obtains the fluctuation component Δθy (=θy'θm) of the reception phase data θy. The fluctuation component Δθy is represented by N bits and stored in a buffer memory 37b.

The fluctuation components Δθx and Δθy read respectively from the buffer memories 37a and 37b are supplied to a time series pattern comparison unit 39 in a pattern comparison and phase correction processing unit 38. The time series pattern comparison unit 39 compares the fluctuation component Δθx of the X polarization with the fluctuation component Δθy of the Y polarization which are substantially in a same symbol time slot. The time series pattern comparison unit 39 generates a timing signal having a value of 1 when fluctuation patterns of Δθx and Δθy, for example, fluctuation directions, for example, signs are substantially the same and generates a timing signal having a value of 0 when the fluctuation patterns of Δθx and Δθy, for example, the fluctuation directions, for example, the signs are different from each other. These timing signals are supplied to phase correction processing units 40a and 40b. The buffer memories 37a and 37b may be omitted.

A phase change of the polarization multiplexing phase modulation optical signal affected by XPM includes XPM-p received by the phase modulation optical signal parallel to the intensity modulation optical signal and XPM-n received by the phase modulation optical signal orthogonal to the intensity modulation optical signal. When the intensity modulation optical signal that becomes the cause of the XPM and the polarization multiplexing phase modulation optical signal that is affected by XPM are both linearly-polarized waves, XPM-n=⅓ XPM-p may be established. At the time of the optical fiber transport, since the intensity modulation optical signal and the phase modulation optical signal become elliptically polarized light to some extent, the respective XPMs received by the two polarization components of the polarization multiplexing phase modulation optical signal may have a difference smaller than a difference between XPM-p and XPM-n. By using the two polarization components of the polarization multiplexing phase modulation optical signal, the influence of the XPM may be reduced.

During a symbol period in which the fluctuation patterns of $\Delta\theta x$ and $\Delta\theta y$ are different from each other, it is assumed that noise derived from a cause other than the XPM is mixed in one of the two phase modulation optical signals, and the phase correction may not be carried out on the two phase modulation optical signals. During a symbol period in which the fluctuation patterns of $\Delta\theta x$ and $\Delta\theta y$ are substantially the same, it is assumed that the noise derived from the XPM is mixed, and the phase correction may be carried out on the two phase modulation optical signals.

Figure 5A:
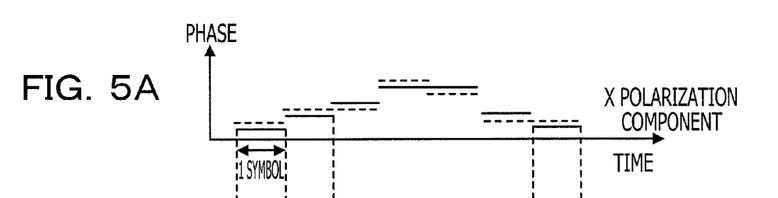
FIGS. 5A to 5C illustrate an exemplary phase fluctuation pattern.
Figure 5B:
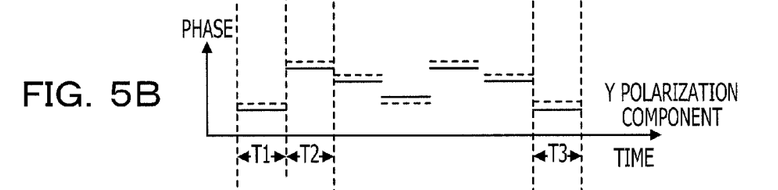
Figure 5C:
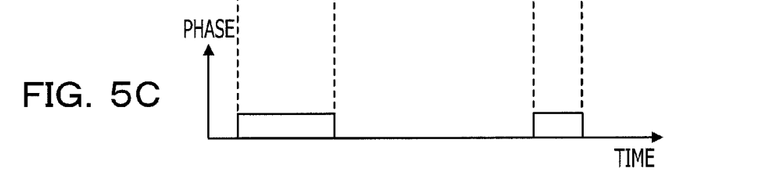

FIGS. 5A to 5C illustrate an exemplary phase fluctuation pattern. A solid line of FIG. 5A represents a transmitter's output phase of the X polarization that changes per symbol, and a broken line of FIG. 5A represents a reception phase $\theta x$. A solid line illustrated in FIG. 5B represents a transmitter's output phase of the Y polarization that changes per symbol, and a broken line illustrated in FIG. 5B represents a reception phase $\theta y$. Since fluctuation directions of $\Delta\theta x$ and $\Delta\theta y$ are substantially the same (+) in symbol periods T1 and T2, the timing signal has the value of 1 illustrated in FIG. 5C. Since the fluctuation directions of $\Delta\theta x$ and $\Delta\theta y$ are substantially the same (+) in a symbol period T3 too, the timing signal has the value of 1 illustrated in FIG. 5C.

The phase correction processing unit 40a illustrated in FIG. 3 receives the timing signal from the time series pattern comparison unit 39, the fluctuation component $\Delta\theta x$ read from the buffer memories 37a, and the X polarization reception phase data $\theta x$ obtained by delaying, by a delay unit 36a, an output of the delay unit 33a by process times of the delay unit 42a, the phase comparison unit 35a, the buffer memories 37a, and the time series pattern comparison unit 39. The phase correction processing unit 40a extracts the fluctuation component $\Delta\theta x$ when the timing signal has the value of 1 and corrects the X polarization reception phase data $\theta x$ in accordance with the extracted fluctuation component $\Delta\theta x$ to output phase data $\theta x'$ after the correction from a terminal 41a.

The phase correction processing unit 40b receives the timing signal from the time series pattern comparison unit 39, the fluctuation component $\Delta\theta y$ read from the buffer memories 37b, and the Y polarization reception phase data $\theta y$ which is obtained by delaying, by a delay unit 36b, an output of the delay unit 33b by process times of the delay unit 42b, the phase comparison unit 35b, the buffer memories 37b, and the time series pattern comparison unit 39. The phase correction processing unit 40b extracts the fluctuation component $\Delta\theta y$ when the timing signal has the value of 1 and corrects the Y polarization reception phase data $\theta y$ in accordance with the extracted fluctuation component $\Delta\theta y$ to output phase data $\theta y'$ after the correction from a terminal 41b.

Figure 6:
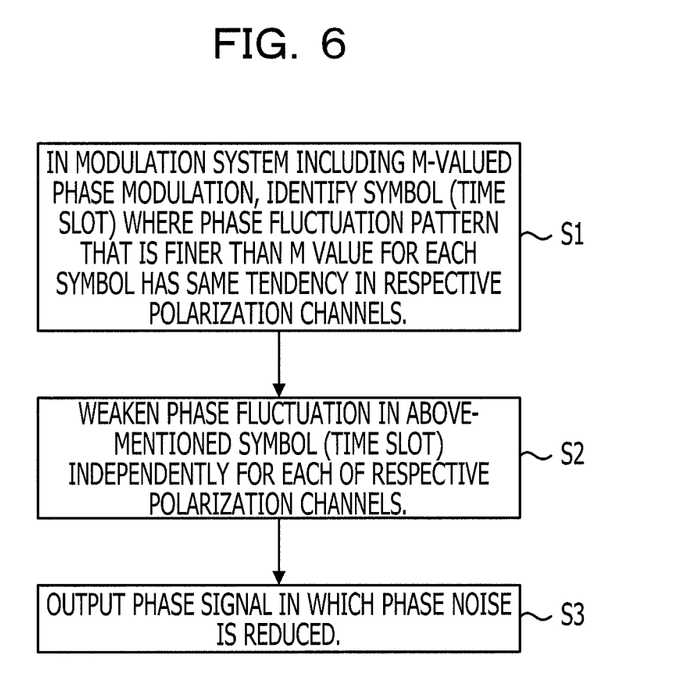
FIG. 6 illustrates an exemplary signal process.

FIG. 6 illustrates an exemplary signal process. The signal process illustrated in FIG. 6 may reduce the degradation caused by the XPM derived from the different wavelength intensity modulation signal. In operation S1 illustrated in FIG. 6, in a modulation system such as the M-valued phase modulation, symbols (time slots) where the N-bit phase fluctuation pattern that is finer than the M value for each symbol has the same tendency in the respective polarization channels (the X polarization and the Y polarization) are identified. In operation S2, the phase fluctuation in the symbols (time slots) are independently weakened for each of the respective polarization channels, and the degradation by the XPM is reduced. In operation S3, the N-bit phase data (phase signal) in which the phase noise, for example, the degradation by the XPM is reduced is output.

Figure 7:
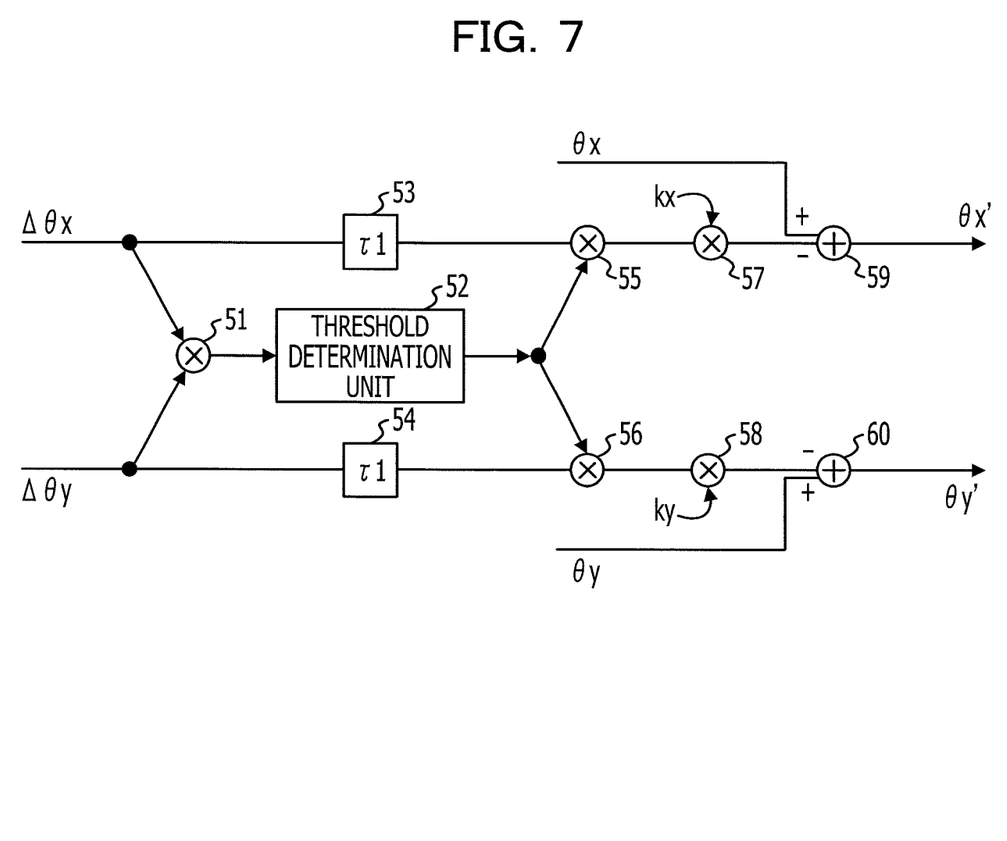
FIG. 7 illustrates an exemplary pattern comparison and phase correction processing unit.

FIG. 7 illustrates an exemplary pattern comparison and phase correction processing unit. The pattern comparison and phase correction processing unit illustrated in FIG. 7 may correspond to the pattern comparison and phase correction processing unit 38 illustrated in FIG. 3. In FIG. 7, the fluctuation component $\Delta\theta x$ of the X polarization and the fluctuation component 40y of the Y polarization are multiplied with each other by a multiplier 51 and supplied to a threshold determination unit 52. The threshold determination unit 52 outputs a timing signal, the value of which becomes 1 when the multiplied value is higher than or equal to a certain threshold (a positive real number), and becomes 0 when the multiplied value is lower than the threshold. For example, the multiplier 51 and the threshold determination unit 52 may correspond to the time series pattern comparison unit 39.

The fluctuation component $\Delta\theta x$ of the X polarization is delayed by a delay element 53 by a processing time $\tau 1$ of the multiplier 51 and the threshold determination unit 52 and supplied to a multiplier 55. The delayed fluctuation component $\Delta\theta x$ is multiplied with the timing signal by the multiplier 55 and supplied to a multiplier 57 in a next stage. Accordingly, the fluctuation component $\Delta\theta x$ of the X polarization is supplied to the multiplier 57 when the timing signal has the value of 1.

The fluctuation component $\Delta\theta y$ of the Y polarization is delayed by a delay element 54 by the processing time $\tau 1$ of the multiplier 51 and the threshold determination unit 52 and supplied to a multiplier 56. The delayed fluctuation component $\Delta\theta x$ is multiplied with the timing signal by the multiplier 56 and supplied to a multiplier 58 in a next stage. Accordingly, the fluctuation component $\Delta\theta y$ of the Y polarization is supplied to the multiplier 58 when the timing signal has the value of 1.

The multiplier 57 multiplies the fluctuation component $\Delta\theta x$ at a time when the timing signal has the value of 1 with an adjustment factor kx to to supply a multiplied result to a subtractor 59. The subtractor 59 subtracts the output of the multiplier 57 from the X polarization reception phase data $\theta x$ to correct the reception phase data $\theta x$ and outputs the phase data $\theta x'$ after the correction.

The multiplier 58 multiplies the fluctuation component $\Delta\theta y$ at a time when the timing signal has the value of 1 with an adjustment factor ky to supply a multiplied result to a subtractor 60. The subtractor 60 subtracts the output of the multiplier 58 from the Y polarization reception phase data $\theta y$ to correct the reception phase data $\theta y$ and outputs the phase data $\theta y'$ after the correction. For example, the multipliers 55 and 57 and the subtractor 59 may correspond to the phase correction processing unit 40a. The multipliers 56 and 58 and the subtractor 60 may correspond to the phase correction processing unit 40b. An extraction unit may include the histogram processing units 32a and 32b, the tentative determination phase estimation units 34a and 34b, the phase comparison units 35a and 35b, the buffer memories 37a and 37b, the time series pattern comparison unit 39, the multipliers 55 and 56, or the like. A correction unit may include the multipliers 57 and 58, the subtractors 59 and 60, or the like.

The adjustment factors kx and ky may be a fixed value, or variably controlled based on a bit error rate (BER) of the reception signal or the like.

Figure 8:
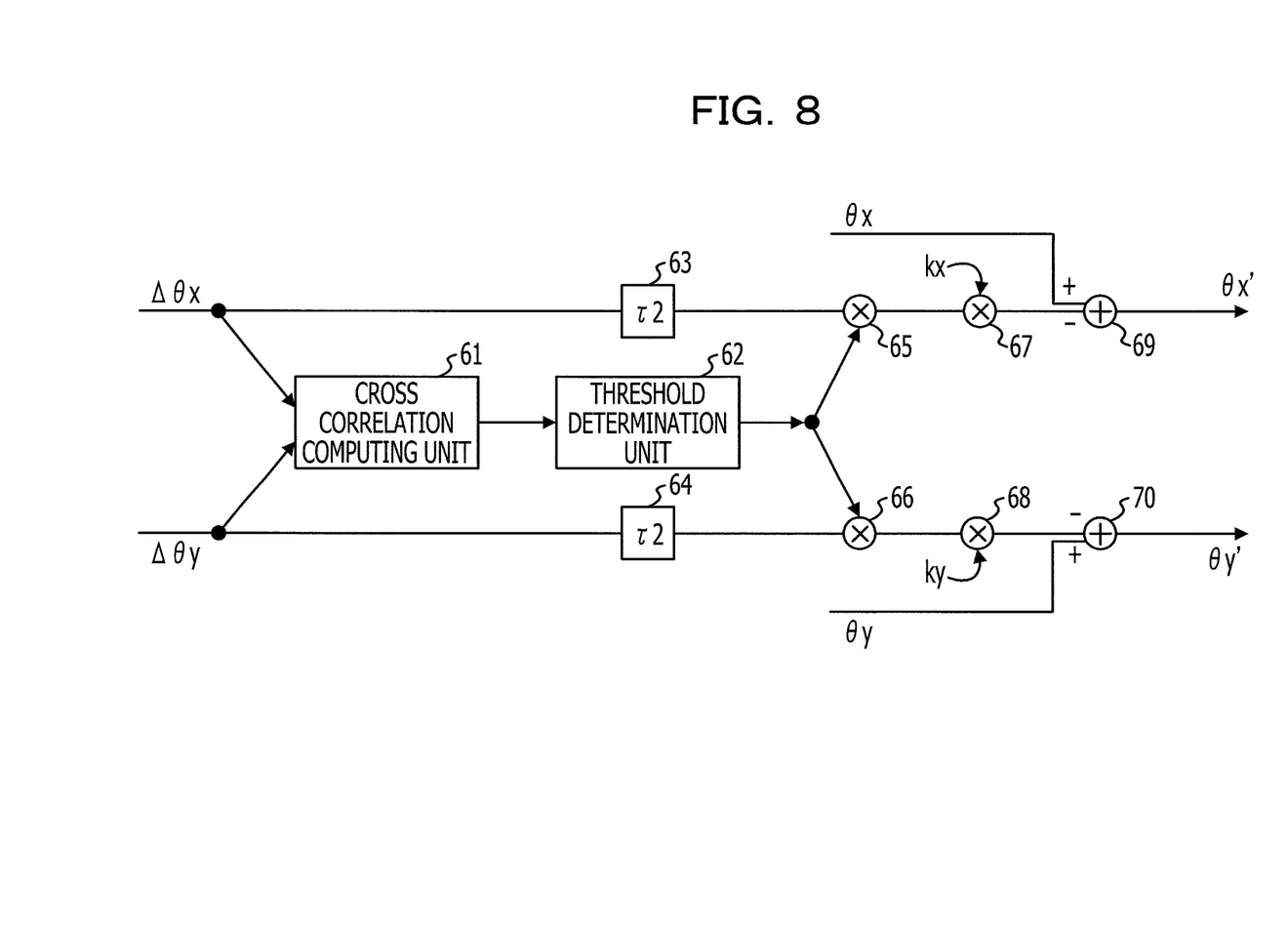
FIG. 8 illustrates an exemplary pattern comparison and phase correction processing unit.

FIG. 8 illustrates an exemplary pattern comparison and phase correction processing unit. A pattern comparison and phase correction processing unit illustrated in FIG. 8 may correspond to the pattern correction and phase correction processing unit 38 illustrated in FIG. 3. In FIG. 8, the fluctuation component $\Delta\theta x$ of the X polarization and the fluctuation component $\Delta\theta y$ of the Y polarization are supplied to a cross correlation computing unit 61. The cross correlation computing unit 61 obtains a cross correlation factor between $\Delta\theta x$ and $\Delta\theta y$ for successive n (n is an integer higher than or equal to 2) symbols to be supplied to a threshold determination unit 62. The cross correlation factor may be a value, for example, which approaches 1 in a case where the correlation is high and approaches 0 in a case where the correlation is low. The threshold determination unit 62 may output a timing signal the value of which becomes 1 when the cross correlation factor is higher than or equal to a certain threshold (for example, 0.5) and a timing signal the value of which becomes 0 when the cross correlation factor is lower than the threshold. For example, the cross correlation computing unit 61 and the threshold determination unit 62 may correspond to the time series pattern comparison unit 39.

The fluctuation component $\Delta\theta x$ of the X polarization is delayed by a delay element 63 by a processing time $\tau 2$ of the cross correlation computing unit 61 and the threshold determination unit 62 and is supplied to a multiplier 65. The fluctuation component $\Delta\theta x$ of the X polarization is multiplied with the timing signal in the multiplier 65 and is supplied to a multiplier 67 in a next stage. Accordingly, the fluctuation component $\Delta\theta x$ of the X polarization is supplied to the multiplier 67 when the timing signal has the value of 1.

The fluctuation component $\Delta\theta y$ of the Y polarization is delayed by a delay element 64 by the processing time $\tau 2$ of the cross correlation computing unit 61 and the threshold determination unit 62 and is supplied to a multiplier 66. The delayed fluctuation component $\Delta\theta y$ of the Y polarization is multiplied with the timing signal in the multiplier 66 and is supplied to a multiplier 68 in a next stage. Accordingly, the fluctuation component $\Delta\theta y$ of the Y polarization is supplied to the multiplier 68 when the timing signal has the value of 1.

The multiplier 67 multiplies the fluctuation component $\Delta\theta x$ at a time when the timing signal has the value of 1 with the adjustment factor kx to supply a multiplied result to a subtractor 69. The subtractor 69 subtracts the output of the multiplier 67 from the X polarization reception phase data $\theta x$ to correct the reception phase data $\theta x$ and outputs the phase data $\theta x'$ after the correction.

The multiplier 68 multiplies the fluctuation component $\Delta\theta y$ at a time when the timing signal has the value of 1 with the adjustment factor ky to supply a multiplied result to a subtractor 70. The subtractor 70 subtracts the output of the multiplier 68 from the Y polarization reception phase data $\theta y$ to correct the reception phase data $\theta y$ and outputs the phase data $\theta y'$ after the correction. For example, the multipliers 65 and 67 and the subtractor 69 may correspond to the phase correction processing unit 40a. The multipliers 66 and 68 and the subtractor 70 may correspond to the phase correction processing unit 40b. For example, The extraction unit may include the histogram processing units 32a and 32b, the tentative determination phase estimation units 34a and 34b, the phase comparison units 35a and 35b, the buffer memories 37a and 37b, the time series pattern comparison unit 39, the multipliers 65 and 66, or the like. For example, the correction unit may include the multipliers 67 and 68, the subtractors 69 and 70, or the like.

The adjustment factors kx and ky may be a fixed value, or variably controlled based on a bit error rate (BER) of the reception signal or the like.

Figure 9:
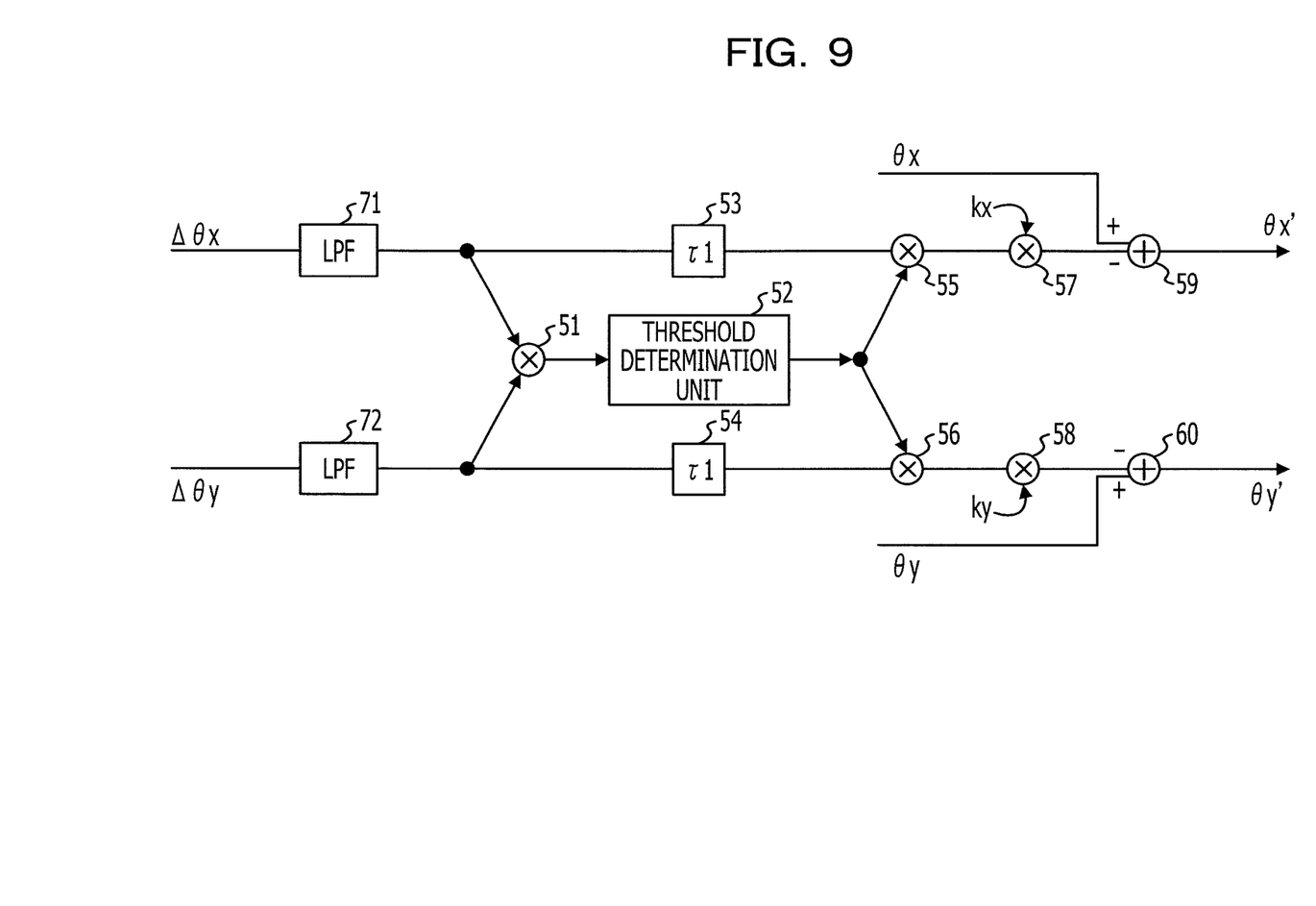
FIG. 9 illustrates an exemplary pattern comparison and phase correction processing unit.

FIG. 9 illustrates an exemplary pattern comparison and phase correction processing unit. A pattern comparison and phase correction processing unit illustrated in FIG. 9 may correspond to the pattern correction and phase correction processing unit 38 illustrated in FIG. 3. In FIG. 9, elements substantially the same or similar to the elements illustrated in FIG. 7 are assigned the same reference symbols. In FIG. 8, the fluctuation component $\Delta\theta x$ of the X polarization passes through a low pass filter (LPF) 71 and is supplied to the multiplier 51 and the delay element 53. The fluctuation component $\Delta\theta y$ of the Y polarization passes through a low pass filter 72 and is supplied to the multiplier 51 and the delay element 54.

The XPM becomes sufficiently small at a fraction of a frequency band for the intensity modulation signal that causes the XPM. Therefore, the fluctuation components $\Delta\theta x$ and $\Delta\theta y$ in a frequency band narrower than the intensity modulation signal band are taken out by the low pass filters 71 and 72, and the signal process is carried out with the influence of the XPM being emphasized. The low pass filters 71 and 72 may be, for example, finite impulse response (FIR) filters or the like. A filter factor for deciding a cutoff frequency of the filter may be set in accordance with a frequency characteristic of the cross phase modulation (XPM) that is generated when the polarization multiplexing phase modulation optical signal and the intensity modulation optical signal share the optical transport pass.

The fluctuation component $\Delta\theta x$ and $\Delta\theta y$ that pass through the low pass filters 71 and 72 are multiplied with each other by the multiplier 51 and is supplied to the threshold determination unit 52. The threshold determination unit 52 may output a timing signal a value of which becomes 1 when the multiplied value is higher than or equal to a certain threshold, for example, a positive integer and a timing signal a value of which becomes 0 when the multiplied value is lower than the threshold. For example, the low pass filters 71 and 72, the multiplier 51, and the threshold determination unit 52 may correspond to the time series pattern comparison unit 39.

The fluctuation component $\Delta\theta x$ of the X polarization output by the low pass filter 71 is delayed by the delay element 53 by the processing time $\tau 1$ of the multiplier 51 and the threshold determination unit 52 and supplied to the multiplier 55. The delayed fluctuation component $\Delta\theta x$ is multiplied with the timing signal by the multiplier 55 and supplied to the multiplier 57 in the next stage. Accordingly, the fluctuation component $\Delta\theta x$ of the X polarization is supplied to the multiplier 57 when the timing signal has the value of 1.

The fluctuation component $\Delta\theta y$ of the Y polarization output by the low pass filter 72 is delayed by the delay element 54 by the processing time $\tau 1$ of the multiplier 51 and the threshold determination unit 52 and supplied to the multiplier 56. The delayed fluctuation component $\Delta\theta y$ is multiplied with the timing signal by the multiplier 56 and is supplied to the multiplier 58 in the next stage. Accordingly, the fluctuation component $\Delta\theta y$ of the Y polarization is supplied to the multiplier 58 when the timing signal has the value of 1.

The multiplier 57 multiplies the fluctuation component $\Delta\theta x$ at a time when the timing signal has the value of 1 with the adjustment factor kx to supply a multiplied result to the subtractor 59. The subtractor 59 subtracts the output of the multiplier 57 from the X polarization reception phase data θx to correct the reception phase data θx and outputs the phase data θx' after the correction.

The multiplier 58 multiplies the fluctuation component Δθy at a time when the timing signal has the value of 1 with the adjustment factor ky to supply a multiplied result to the subtractor 60. The subtractor 60 subtracts the output of the multiplier 58 from the Y polarization reception phase data θy to correct the reception phase data θy and outputs the phase data θy' after the correction. For example, the multipliers 55 and 57 and the subtractor 59 may correspond to the phase correction processing unit 40a. For example, the multipliers 56 and 58 and the subtractor 60 may correspond to the phase correction processing unit 40b. For example, an extraction unit may include the histogram processing units 32a and 32b, the tentative determination phase estimation units 34a and 34b, the phase comparison units 35a and 35b, the buffer memories 37a and 37b, the time series pattern comparison unit 39, the low pass filters 71 and 72, the multipliers 55 and 56, or the like. For example, a correction unit may include the multipliers 57 and 58, the subtractors 59 and 60, or the like.

The adjustment factors kx and ky may be a fixed value, or variably controlled based on a bit error rate (BER) of the reception signal or the like.

Figure 10:
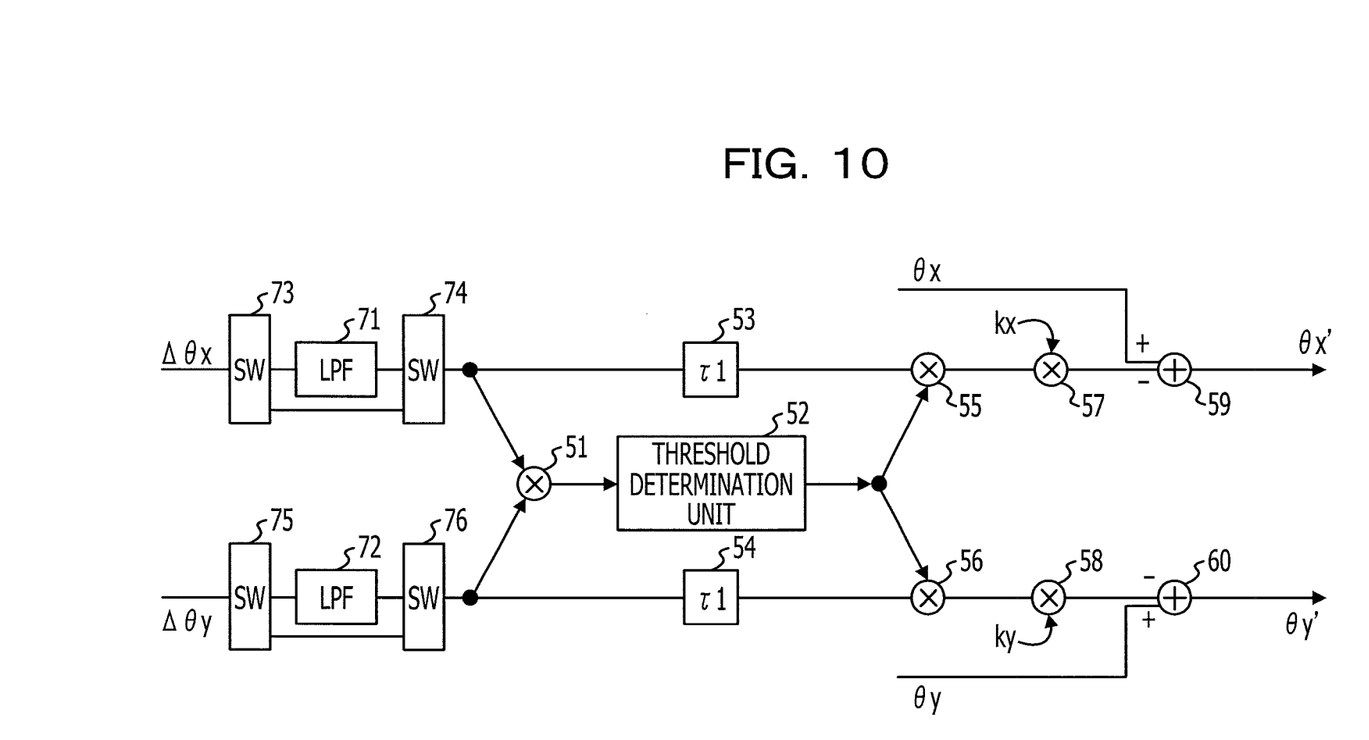
FIG. 10 illustrates an exemplary pattern comparison and phase correction processing unit.

FIG. 10 illustrates an exemplary pattern comparison and phase correction processing unit. A pattern comparison and phase correction processing unit illustrated in FIG. 10 may correspond to the pattern correction and phase correction processing unit 38 illustrated in FIG. 3. In FIG. 10, elements substantially the same or similar to the elements illustrated in FIG. 9 are assigned the same reference symbols. In FIG. 10, the fluctuation component Δθx of the X polarization is supplied to a 1×2 switch 73. The switch 73 supplies the fluctuation component Δθx of the X polarization to a 2×1 switch 74 via the low pass filter 71, or to the 2×1 switch 74 while bypassing the low pass filter 71. The switch 74 selects one of the fluctuation component Δθx that passes through the low pass filter 71 and the fluctuation component Δθx that bypasses the low pass filter 71 to supply the selected one to the multiplier 51 and the delay element 53.

A switch 75 supplies the fluctuation component Δθy of the Y polarization to a 2×1 switch 76 via the low pass filter 72, or to the 2×1 switch 76 while bypassing the low pass filter 72. The switch 76 selects one of the fluctuation component Δθy that passes through the low pass filter 72 and the fluctuation component Δθy that bypasses the low pass filter 72 to supply the selected one to the multiplier 51 and the delay element 54.

The switches 74 and 76 and subsequent circuits illustrated in FIG. 10 may be substantially the same or similar to the circuits illustrated in FIG. 9, and an operational description may be omitted or reduced.

The switching between the signal that passes the low pass filter and the signal that bypasses the low pass filter is carried out. Accordingly, when the optical fiber transport path includes a single mode fiber (SMF) and a dispersion compensation optical fiber, the XPM becomes small in a fraction of the frequency band for the intensity modulation signal that causes the XPM, and a frequency band narrower than the intensity modulation signal band is taken into account. The influence of the XPM is emphasized by using the low pass filter, and the signal is processed.

When the optical fiber transport path includes a dispersion shift optical fiber (DSF) having a small chromatic dispersion, the intensity of the XPM is large in a wide band. Thus, the low pass filter may be omitted for taking into account the entire band of the intensity modulation signal that causes the XPM. The switches 73 to 76 are provided to perform switching between the optical fiber transport paths, and one of the signal that passes through the low pass filter and the signal that bypasses the low pass filter may be selected.

When the low pass filters 71 and 72 include a digital filter such as an FIR filter, the switching for the signal in the entire frequency band to pass may be carried out, instead of the switches 73 to 76, by changing the filter factors of the low pass filters 71 and 72.

The frequency characteristic of the XPM is described, for example, in a reference literature: T. K. Chiang, N. Kagi, M. E. Marhic, L. G. Kazovsky, "Cross-Phase Modulation in Fiber Links with Multiple Optical Amplifiers and Dispersion Compensators", *Journal of Lightwave Technology*, Volume: 14, Issue: 3, on page 249, 1996, or the like.

Although the low pass filters 71 and 72 are used, process substantially equivalent to the function of low pass filters, which transform the reception phase data θx and θy that are the signals in time domain into frequency domain signals, may be adopted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiver comprising:
    an optical phase hybrid to receive a polarization multiplexing phase modulation optical signal and output two polarization components;
    an extraction circuit to extract a phase fluctuation component common to phase data of the two polarization components that are separated in a coherent reception of the polarization multiplexing phase modulation optical signal, the phase data including transmitted information of the polarization multiplexing optical phase modulation data; and
    a correction circuit to correct the phase data of the two polarization components in accordance with the phase fluctuation component.

2. The receiver according to claim 1, wherein the extraction circuit obtains phase differences between the phase data of the two polarization components and estimated values of phases estimated based on phase data of a plurality of symbols of the two polarization components as the phase fluctuation components per symbol, and wherein the correction circuit corrects the phase data of the two polarization components when a multiplied value of the phase fluctuation components of the two polarization components exceeds a certain threshold.

3. The receiver according to claim 1, wherein the extraction circuit obtains phase differences between the phase data of the two polarization components and estimated values of phases estimated based on phase data of a plurality of symbols of the two polarization components as the phase fluctuation components per symbol and obtains a cross correlation factor of the phase fluctuation components with regard to a plurality of successive symbols, and wherein the correction circuit corrects the phase data of the two polarization components when the cross correlation factor exceeds a certain threshold.

4. The receiver according to claim 1, wherein the extraction circuit obtains phase differences between the phase data of the two polarization components and estimated values of phases estimated based on phase data of a plurality of symbols of the two polarization components as the phase fluctuation components per symbol, and wherein the correction circuit corrects the phase data of the two polarization components when a multiplied value after a band limitation of the phase fluctuation components exceeds a certain threshold.

5. The receiver according to claim 1, wherein the extraction circuit obtains phase differences between the phase data of the two polarization components and estimated values of phases determined based on phase data of a plurality of symbols of the two polarization components as the phase fluctuation components per symbol, and wherein the correction circuit corrects the phase data of the two polarization components when a multiplied value after a band limitation of the phase fluctuation components by a low pass filter exceeds a certain threshold.

6. The receiver according to claim 5, wherein a frequency characteristic of the low pass filter is set in accordance with a frequency characteristic of a cross phase modulation by an intensity modulation optical signal that shares an optical transport path in which the polarization multiplexing phase modulation optical signal is transported.

7. The receiver according to claim 1, wherein the correction circuit corrects the phase data by multiplying the phase fluctuation components with an adjustment factor and subtracting the multiplied data from the phase data of the two polarization components.

8. The receiver according to claim 7, wherein the adjustment factor is set in accordance with an error rate of a signal obtained by decoding the phase modulation optical signal.

9. A cross phase modulation reduction method comprising:
receiving a polarization multiplexing phase modulation optical signal;
outputting two polarization components based on the polarization multiplexing phase modulation optical signal;
extracting phase fluctuation component common to phase data of the two polarization components that are separated in a coherent reception of the polarization multiplexing phase modulation optical signal, the phase data including transmitted information of the polarization multiplexing optical phase modulation data; and
changing the phase data of the two polarization components in accordance with the phase fluctuation component.

10. The cross phase modulation reduction method according to claim 9, further comprising:
obtaining phase differences between the phase data of the two polarization components and estimated values of phases estimated based on phase data of a plurality of symbols of the two polarization components as the phase fluctuation components per symbol; and
correcting the phase data of the two polarization components when a multiplied value of the phase fluctuation components of the two polarization components exceeds a certain threshold.

11. The cross phase modulation reduction method according to claim 9, further comprising:
obtaining phase differences between the phase data of the two polarization components and estimated values of the phases estimated based on phase data of a plurality of symbols of the two polarization components as the phase fluctuation components per symbol;
obtaining a cross correlation factor of the phase fluctuation components with regard to a plurality of successive symbols; and
correcting the phase data of the two polarization components when the cross correlation factor exceeds a certain threshold.

12. The cross phase modulation reduction method according to claim 9, further comprising:
obtaining phase differences between the phase data of the two polarization components and estimated values of the phases estimated based on phase data of a plurality of symbols of the two polarization components as the phase fluctuation components per symbol; and
correcting the phase data of the two polarization components when a multiplied value after each of the phase fluctuation components of after a band limitation exceeds a certain threshold.

13. The cross phase modulation reduction method according to claim 9, further comprising:
obtaining phase differences between the phase data of the two polarization components and estimated values of phases determined based on phase data of a plurality of symbols of the two polarization components as the phase fluctuation components per symbol; and
correcting the phase data of the two polarization components when a multiplied value after a band limitation of the phase fluctuation components by a low pass filter exceeds a certain threshold.

* * * * *